(12) United States Patent
Uguen et al.

(10) Patent No.: US 6,479,955 B2
(45) Date of Patent: Nov. 12, 2002

(54) METHOD OF ENERGIZING A POLYPHASE MOTOR HAVING AN INCREASED ENERGY EFFICIENCY

(75) Inventors: Emeric Uguen, La Presnaye au Sauvage (FR); Henricus Cornelis Johannes Buthker; Henricus Marinus Van Hout, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 2 days.

(21) Appl. No.: 09/730,427

(22) Filed: Dec. 5, 2000

(65) Prior Publication Data

US 2001/0006330 A1 Jul. 5, 2001

(30) Foreign Application Priority Data

Dec. 7, 1999 (FR) .............................. 9915420

(51) Int. Cl.$^7$ .............................................. H02K 29/00
(52) U.S. Cl. ...................................... 318/254; 318/439
(58) Field of Search ......................... 318/138, 245–254, 318/439

(56) References Cited

U.S. PATENT DOCUMENTS

| | | | | |
|---|---|---|---|---|
| 4,357,996 A | * | 11/1982 | Ishii et al. ............... 388/847 X |
| 5,041,768 A | * | 8/1991 | Herrmann .................... 318/138 |
| 5,307,439 A | * | 4/1994 | Enami ......................... 388/811 |
| 5,463,300 A | * | 10/1995 | Oximberg ................... 318/801 |
| 5,986,493 A | * | 11/1999 | Li .............................. 327/328 |
| 5,998,946 A | * | 12/1999 | Kim ........................... 318/254 |
| 6,204,621 B1 | * | 3/2001 | Gotou ......................... 318/599 |
| 6,246,205 B1 | * | 6/2001 | Kujira et al. ............... 318/685 |

* cited by examiner

Primary Examiner—Jeffrey Donels
(74) Attorney, Agent, or Firm—Steven R. Biren (57) ABSTRACT

The invention relates to a method of energizing a polyphase motor by means of a plurality of coils (E1, E2, E3), each coil intended to be excited by means of a control signal (I1, I2, I3). The method in accordance with the invention comprises the following steps:

identifying the control signal having the largest absolute value, and connecting the corresponding coil to a reference-potential terminal (VCC or GND).

The invention enables the losses caused by switching operations in the power stages energizing the coils to be reduced, and to increase the efficiency of the power supply device of the motor.

12 Claims, 7 Drawing Sheets

FIG.9

METHOD OF ENERGIZING A POLYPHASE MOTOR HAVING AN INCREASED ENERGY EFFICIENCY

BACKGROUND OF THE INVENTION

The invention relates to a method of energizing a polyphase motor by means of a plurality of coils, each coil intended to be excited by means of a control signal.

Polyphase motors are customarily used in many applications, particularly within information-storage systems including a disc at the surface of which the information is stored, and at least one read and/or write head for scanning the surface of said disc, which disc is driven to rotation by the polyphase motor.

The information can for example be engraved on the disc, allowing it to be optically read, or the information may consist of local magnetic fields, allowing it to be magnetically read, for example by means of a magneto-resistive rod. The hard disks used in the information industry are of the latter type.

The motors used in said latter type of applications generally are three-phase motors, i.e. they are provided with three coils which are to be excited by three currents, forming the control signals, which are successively shifted through $2.\pi/3$, which is achieved by subjecting the coils to three voltages, which are also successively shifted through $2.\pi/3$ by means of a power supply device. A voltage is supplied to each coil by a power stage comprising two transistors, which are arranged in series between two supply terminals, i.e. a positive supply terminal and ground, an intermediate node between said transistors being connected to the coil.

In accordance with the currently used power supply methods, the supply voltage applied to each of the coils results from a particular control of the switching of the transistors included in the associated power stage. However, owing to large parasitic capacitances due to the large size of the power transistors, the switchings of these transistors cause losses which are not inconsiderable and hence have an adverse effect on the energy efficiency of the power supply device of the motor.

SUMMARY OF THE INVENTION

One of the objects of the invention is to improve the efficiency by providing a power supply method requiring a smaller number of switching operations of the transistors included in the power stages as compared to the known power supply methods used in polyphase motors.

To achieve this, a power supply method as described in the opening paragraph comprises the following stages:
   identifying the control signal having the largest absolute value, and
   connecting the corresponding coil to a reference-potential terminal.

The invention enables the number of switching operations of the power transistors, which are necessary to energize a three-phase motor, to be reduced by one third, because each coil is connected to a reference-potential terminal during one third of the period of its control signal. In more general terms, the invention enables the number of switching operations of power transistors, necessary to energize a motor comprising N coils, to be reduced by 1/N.

In a variant of the invention, a power supply method as described in the opening paragraph includes the following stages:
   identifying the control signal having the largest instantaneous value, and
   connecting the corresponding coil to a reference-potential terminal.

In this variant of the invention, the coils are alternately connected to the same reference-potential terminal, for example the positive supply terminal. By virtue thereof, the structure of the circuitry used to implement the invention can be simplified.

In another variant of the invention, a power supply method as described in the opening paragraph includes the following stages:
   identifying the control signal having the smallest instantaneous value, and
   connecting the corresponding coil to a reference-potential terminal.

In this variant of the invention, the coils are alternately connected to the same reference-potential terminal, for example ground. By virtue thereof, the structure of the circuitry used to implement the invention can be simplified.

In a particular embodiment in accordance with the invention, the identification step includes detection of a sign reversal of a control signal.

Such a detection enables a simple implementation of the identification step.

In an advantageous embodiment of the invention, each control signal is composed of a succession of discrete values which follow a pseudo-sine line as a function of time when the coil excited by said signal is not connected to a reference-potential terminal. This embodiment enables the value of the supply voltage on each one of the coils to be easily monitored, in digital form.

In a preferred embodiment of the invention, each discrete value is obtained by setting a duty cycle of a signal referred to as driving signal, which serves to control the conduction of two complementary transistors, which are arranged in series between two supply terminals, an intermediate node between said transistors being connected to one terminal of one of the coils.

By virtue of this embodiment, it is ensured that the control signals all follow a polyphase sinusoidal line, which corresponds to the line they would follow if they had to excite polyphase coils that were not alternately connected to one reference-potential terminal, as is the case in known power supply methods. As will be described later in this document, apart from the reduction of losses caused by the switching operations of the transistors included in the power stages, the invention enables the supply voltage of these power stages to be reduced without a modification of the mechanical energy supplied by the motor, or an increase of this mechanical energy at an equal supply voltage, which is tantamount to a substantial, advantageous increase of the energy efficiency of the power supply device of the motor.

In one of the possible embodiments, the invention relates to a device for supplying power to a polyphase motor comprising a plurality of coils, each of which is to be excited by means of a control signal, which device comprises:
   control means enabling each coil to be alternately connected to a reference-potential terminal, and
   identification means enabling identification of the coil which is to be connected to the reference-potential terminal.

As described hereinabove, the coil that will be identified by the identification means in order to be connected to a reference-potential terminal, can be the coil that is subjected to the control signal having the largest absolute value, the largest instantaneous value, or the lowest instantaneous value.

Though the invention can suitably be used in all types of systems where a polyphase motor is used, it can be implemented particularly advantageously in systems for storing information. Thus, the invention also relates to an apparatus for storing information, comprising:

a disc on the surface of which information is stored, a polyphase motor intended to drive the disc to rotation, at least one read/write head intended to scan the surface of the disc, and a device for supplying power to the motor, as described hereinabove.

These and other aspects of the invention will be apparent from and elucidated with reference to the exemplary embodiment(s) described hereinafter.

DESCRIPTION OF THE PREFERRED EMBODIMENTS

Figure 1:
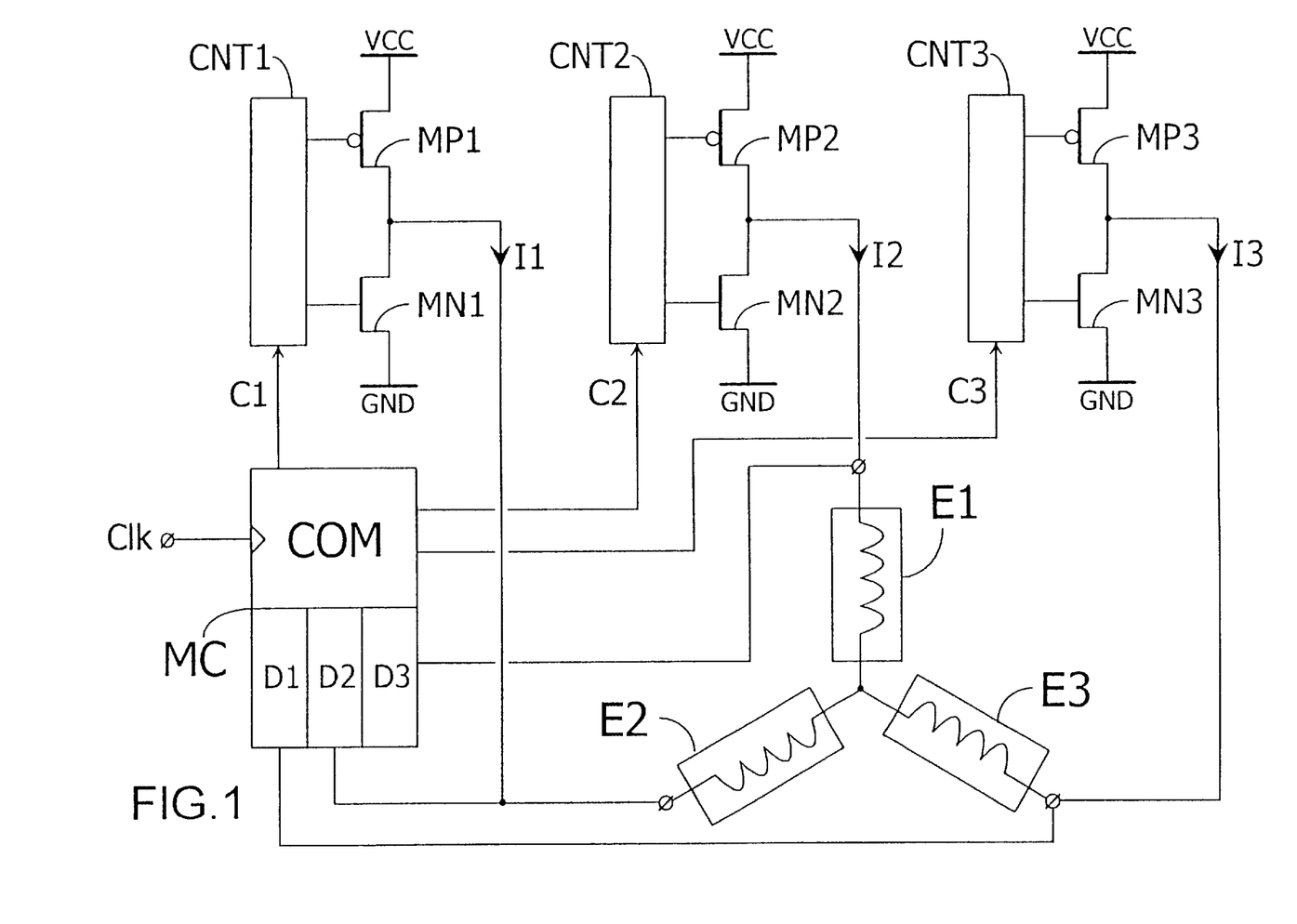
FIG. 1 shows a part of a functional diagram of a power supply device wherein the invention is embodied.

FIG. 1 diagrammatically shows a device for supplying power to a polyphase motor in accordance with the invention. In this example, the motor is a three-phase motor provided with a first, a second and a third coil E1, E2 and E3, respectively, which are arranged in the form of a star and are to be excited by means of, respectively, a first, a second and a third control signal I1, I2 and I3, in this case currents. For this purpose, a voltage is applied to each coil Ei (i=1 to 3) by means of a power stage comprising two transistors MPi and MNi, which are arranged in series between two supply terminals VCC and GND, i.e. a positive supply terminal and ground, a node in between these transistors MPi and MNi being connected to the coil Ei. In this example, the transistors MPi and MNi are conductivity-type complementary transistors, i.e., respectively PMOS and NMOS.

The device described herein comprises control means CNTi (i=1 to 3) enabling each coil Ei to be alternately connected to a reference-potential terminal, in this case VCC or GND. The power supply device additionally includes a microcontroller MC, which comprises a driving module COM of the control means CNTi, and identification means Di (i=1 to 3), enabling to identify that one of the coils Ei that is to be connected to the reference-potential terminal VCC or GND.

In many known power supply devices, each coil is subjected to a voltage Vei, which adopts a succession of discrete values obtained by setting a duty cycle of a signal, which is referred to as driving signal, and which serves to control the conduction of the two transistors MPi and MNi. As the transistor MPi is conducting when the driving signal is at logic level zero, and the transistor MNi is conducting when the driving signal is at logic level one, Ki denotes a duty cycle of the driving signal, which is defined as being equal to the ratio between the time during which the driving signal is at logic level 0 and the period of the driving signal. The supply voltage of each coil can thus be written as $V_{ei}=Ki.VCC$.

For a better understanding of the explanation of the functioning of the power supply device described in FIG. 1, reference is made to any one of the FIGS. 5a, 6a, 7a or 8a, which show the evolution of the control signals Ii (i=1 to N). Although these signals consist of discrete values, they form sinusoidal progressions, as is shown in said FIGS. To simplify the explanation, it is assumed that $Ii=I0.\sin(wt-(i-1).2\pi/3)$, where $w=2\pi.F$, F being the frequency of the control signals.

In accordance with the invention, as soon the absolute value of one of the control signals Ii becomes larger than that of the other control signals, the corresponding coil Ei is connected to a reference-potential terminal. Thus, when wt=60°, the absolute value of the first control signal I1 becomes larger than the absolute value of the other control signals, said first control signal value being positive, and the first coil E1 is connected to the positive supply terminal VCC via the transistor MP1. When wt=120°, the absolute value of the second control signal I2 becomes superior to the absolute value of the other control signals, and the second coil E2 is connected to the ground GND via the transistor MN2, while the first coil E1 is subjected again to its driving signal. At a later stage, when wt=240°, the absolute value of the first control signal I1 again becomes superior to the absolute value of the other control signals, and the first coil E1 is connected to the ground GND via the transistor MN1.

Thus, each coil Ei (i=1 to 3) is alternately connected, during one sixth of each period, to the positive supply terminal VCC or to the ground GND, which means that during one third of the period, the supply voltage on each coil is not determined by the switching operations of the transistors MPi and MNi of the associated power stage. The invention thus enables the number of switching operations necessary to energize the coils to be reduced by one third, and hence to equally reduce the losses caused by said switching operations.

In accordance with a variant of the invention, it is possible to connect to the ground GND the coil Ei whose associated control signal Ii has the smallest instantaneous value. A power supply device embodying this variant functions as follows: when wt=90°, the instantaneous value of the first control signal I1 is negative and becomes smaller than the instantaneous value of the other control signals, and the first coil E1 is connected to the ground GND via the transistor MN1. When wt=210°, the instantaneous value of the second control signal I2 is negative and becomes smaller than the instantaneous value of the other control signals, and the second coil E2 is connected to the ground GND via the transistor MN2, while the first coil E1 is again subjected to its driving signal.

When wt=330°, the instantaneous value of the third control signal I3 is negative and becomes smaller than the instantaneous value of the other control signals, and the third coil E3 is connected to the ground GND via the transistor MN3.

Thus, during each period, each coil is connected to the ground GND during one third of said period, which means that during a third of the period the supply voltage on the coil is not determined by the switching operations of the transistors MPi and MNi of the associated power stage. This variant of the invention thus also enables the number of switching operations necessary to energize the coils to be reduced by one third, and hence to equally reduce the losses caused by said switching operations. This variant additionally enables a simplification of the structure of the control and identification means, as will be described hereinbelow. In another variant of the invention, it is possible to connect to the positive supply terminal VCC the coil Ei whose associated control signal Ii has the largest instantaneous value, the advantages resulting therefrom being similar to those described hereinabove. The explanation given above is readily transposable to the description of such a variant.

Figure 2:
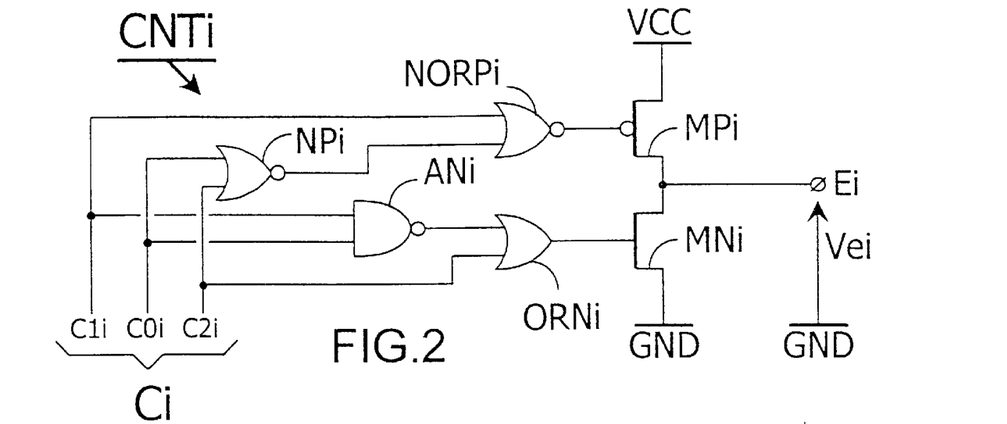
FIG. 2 is an electrical circuit diagram showing control means included in such a device.

FIG. 2 is an electric circuit diagram showing control means CNTi for controlling the conduction of two transistors MPi and MNi, which are arranged in series between two supply terminals VCC and GND, i.e. a positive supply terminal and ground, an intermediate node between said transistors MPi and MNi being connected to the coil Ei. In this example, the transistors MPi and MNi are, respectively, PMOS and NMOS transistors. In this example, the control means CNTi comprise a logic NOR gate NORPi, an output of which controls the conduction of the transistor PMOS MPi, an input of which receives a first identification signal C1i, and another input of which is connected to an output of another logic NOR gate NPi, an input of which receives a driving signal C0i, and another input of which receives a second identification signal C2i. The first and the second identification signal C1i and C2i, along with the driving signal C0i, form a monitoring signal Ci, which originates from the microcontroller MC.

The control means CNTi additionally comprise a logic OR gate ORNi, an output of which controls the conduction of the transistor NMOS MNi, an input of which receives the second identification signal C2i, and another input of which is connected to an output of a logic NAND gate ANi, an input of which receives the driving signal C0i, and another input of which receives a first identification signal C1i.

When the absolute value of the control signal Ii, which excites the coil Ei, is not larger than the absolute value of the other control signals, the supply voltage Vei of the coil Ei is determined by the duty cycle Ki, defined hereinabove, of driving signal C0i, and Vei=Ki.VCC.

When the absolute value of the control signal Ii associated with the coil Ei is larger than the absolute value of the other control signals, said control signal Ii being positive, the identification means assign a logic level 1 to the first identification signal C1i, which makes the output of the logic NOR gate NORPi assume a logic level 0 and causes the transistor PMOS MPi to become conducting and hence the coil Ei to become connected to the positive supply terminal VCC. Simultaneously, the logic level 1 of the first identification signal C1i precludes, via the logic NAND gate ANi, that a logic level 1 of the driving signal C0i causes the transistor NMOS MNi to become conducting, which would cause a short-circuit.

When the absolute value of the control signal Ii associated with the coil Ei is larger than the absolute value of the other control signals, said control signal Ii being negative, the identification means assign a logic level 1 to the second identification signal C2i, which causes the output of the logic OR gate ORNi to assume a logic level 1 and renders the transistor NMOS MNi conductive, and hence causes the coil Ei to be connected to the ground GND.

Simultaneously, the logic level 1 of the second identification signal C2i precludes, via the logic NOR gate NPi, that a logic level 0 of the driving signal C0i causes the transistor PMOS MPi to become conductive, which would cause a short circuit.

It will be clear that if, in accordance with one of the variants of the invention described hereinabove, a coil Ei is connected to ground if the instantaneous value of its control signal Ii is smaller than the instantaneous value of the other control signals, the structure of the control means can be simplified substantially. In such an embodiment of the invention, a single identification signal, in this case the second identification signal C2i, will be significant, and the logic gates NORPi and ANi will be useless. Conversely, if a coil is connected to the positive supply terminal VCC if the instantaneous value of its control signal Ii is larger than the instantaneous value of the other control signals, only the first identification signal C1i will be significant, and the logic gates ORNi and MPi will be useless.

Figure 3:
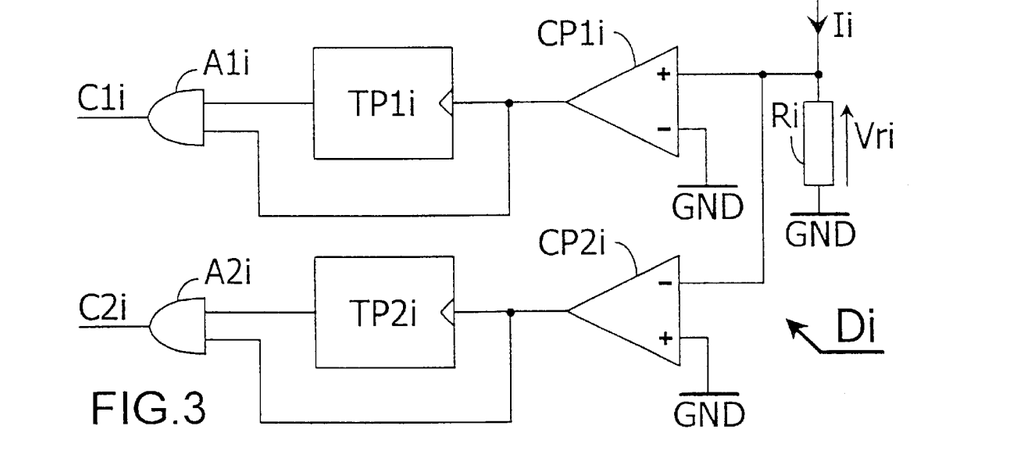
FIG. 3 is a functional diagram showing identification means included in such a device.

FIG. 3 diagrammatically shows a possible embodiment of identification means Di (i=1 to 3). These means comprise means for detecting a reversal of sign of a control signal, which detection means include a resistor Ri, which serves to receive an image of a control signal Ii, which is obtained, for example, by means of a current mirror, which is not shown in the drawing. One terminal of the resistor Ri is connected to the ground GND, and the other terminal is connected to non-inverting and inverting inputs of, respectively, a first and a second comparator CP1i and CP2i. The first and the second comparator CP1i and CP2i are additionally provided with, respectively, inverting and non-inverting inputs, which are connected to the ground GND. The identification means Di additionally comprise a first and a second delay module TP1i and TP2i, respectively, which are to be activated when they receive an ascending edge at clock inputs, which are connected to the outputs of the first and the second comparator CP1i and CP2i, respectively.

The identification means Di comprise a first logic AND gate A1i, one input of which is connected to an output of the first delay module TP1i, another input of which is connected to the output of the first comparator CP1i, and an output of which is used to supply the first identification signal C1i.

The identification means Di finally comprise a second logic AND gate A2i, one input of which is connected to an output of the second delay module TP2i, another input of which is connected to the output of the second comparator CP2i, and an output of which is used to supply the second identification signal C2i.

A better understanding of the way in which the identification means function will be obtained by considering the case where i=1: when, for t=0, the control signal Ii becomes positive, a voltage Vri on the terminals of the resistor Ri becomes positive. The outputs of the first and the second comparator CP1i and CP2i then supply the clock inputs of first and second delay modules TP1i and TP2i, respectively, with ascending and descending edges. In this example, the descending edge received by the second delay module TP2i does not affect the behavior of said second delay module. On the other hand, the first delay module TP1i is activated by the ascending edge it receives, which causes the output signal of said first delay module to switch from the logic level 0 to the logic level 1, after a period of time tp, such as w.tp=π/6. Right at that instant, the absolute value of the control signal Ii becomes effectively larger than the absolute value of the other control signals. The first logic AND gate A1i, which then receives a logic level 1 at its two inputs, assigns the logic level 1 to its output signal, which forms the first identification signal C1i, which makes the control means CNTi connect the coil Ei excited by the control signal Ii to the positive supply terminal VCC. A period of time tn after the change-over of the output of the first delay module TP1i, chosen to be such that tn=tp, the output of said delay module returns to logic level 0. Conversely, if wt=π, the control signal Ii becomes negative and the voltage Vri on the terminals of the resistor Ri becomes negative. The outputs of the first and the second comparator CP1i and CP2i, respectively, supply the clock inputs of first and second delay modules TP1i and TP2i, respectively, with descending and ascending edges. In this example, the descending edge received by the first delay module TP1i does not affect the behavior of said first delay module. On the other hand, the second delay module TP2i is activated by the ascending edge it receives, which causes its output signal to switch from the logic level 0 to the logic level 1 after a period of time tp, such as w.tp=π/6,. Right at that instant, the absolute value of the control signal Ii becomes effectively larger than the absolute value of the other control signals. The second logic AND gate A2i, which then receives a logic level 1 at its two inputs, assigns the logic level 1 to its output signal, which forms the second identification signal C2i, which makes the control means CNTi connect the coil Ei excited by the control signal Ii to the ground GND. A period of time tn after the change-over of the output of the first delay module TP1i, chosen to be such that tn=tp, the output of this delay module returns to logic level 0.

It can be easily understood that in the case where, in accordance with one of the variants of the invention described hereinabove, a coil Ei is connected to ground if the instantaneous value of its control signal Ii is smaller than the instantaneous value of the other control signals, it will be possible to substantially simplify the structure of the identification means. In such an embodiment of the invention, a single identification signal, in this case the second identification signal C2i, will be significant, and the first comparator CP1i, the first delay module TP1i as well as the first logic AND gate A1i will be useless. Conversely, if a coil is to be connected to the positive supply terminal VCC if the instantaneous value of its control signal Ii is larger than the instantaneous value of the other control signals, only the first identification signal C1i will be significant, and the second comparator CP2i, the second delay module TP2i as well as the second logic AND gate A2i will be useless. In these two cases tp will be chosen to be such that w.tp=π/3 and tn=4.tp.

In a particular embodiment in accordance with the invention, the inverting and non-inverting terminals of the first and the second comparator CP1i and CP2i, respectively, can be connected to the coil Ei, the non-inverting terminals and the inverting terminals of said comparators being connected to the ground GND. Each transistor MPi and MNi has a temporary resistance Ron acting as the resistor Ri when the transistor is conducting.

Figure 4:
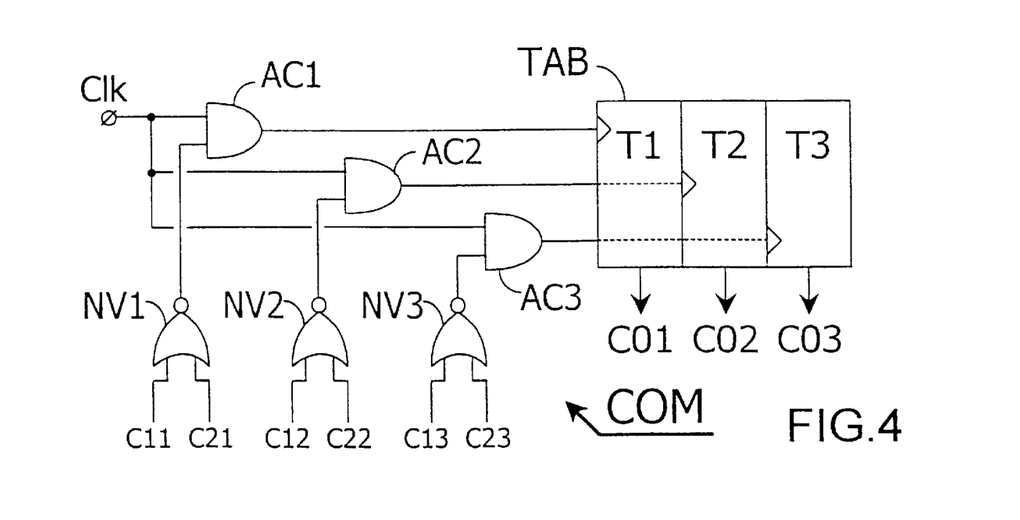
FIG. 4 is a functional diagram showing driving means included in such a device.

FIG. 4 diagrammatically shows a driving module COM included in a power supply device in accordance with a preferred embodiment of the invention. This driving module can very suitably be integrated in the microcontroller MC, and comprises a table TAB comprising three zones T1, T2 and T3 for supplying, respectively, the driving signals C01, C02 and C03 whose duty cycles K1, K2 and K3 are determined by means of pointers, not shown in the Figure, which are incremented by means of a clock signal CLK in accordance with a technique which is well known to those skilled in the art. The driving module COM additionally comprises inhibition means ACi, ANi and NVi (i=1 to 3) for deactivating each one of the pointers, which inhibition means are activated when either the first or the second identification signal C1i or C2i corresponding to the driving signal C0i obtained via the relevant pointer indicates that the corresponding coil must be connected to a reference terminal.

Thus, when it has been established through identification that a coil Ei has to be connected to one of the reference terminals, one of its associated identification signals C1i or C2i is at the logic level 1, forcing the outputs of the logic NOR gate NVi and logic AND gate ACi to 0, and postponing the arrival of the clock signal CLK at the zone Ti, thereby precluding the incrementation of the pointer. When the inhibition is removed, i.e. when the supply voltage on the coil Ei has to be determined again by means of the duty cycle Ki of the associated driving signal C0i, the two identification signals C1i and C2i will be at logic level 0 and the clock pulses will be able to reach the zone Ti again, thereby enabling an incrementation of the corresponding pointer.

In the known power supply devices, the value of a duty cycle ratio Ki0 of a driving signal C0i is generally expressed as follows: $Ki0 = \frac{1}{2} + K.\sin(wt-(i-1).2\pi/3)$, where K is a constant which determines the amplitude I0 of the control signals Ii, and is necessarily smaller than or equal to ½, since it is assumed that Vei=Ki0.VCC. When all duty cycles Ki0 are equal to ½, all coils receive a supply voltage that is equal to VCC/2, and the motor is stationary. The maximum value of the supply voltage Vei that is necessary to obtain control signals Ii such that $Ii=I0. \sin(wt-(i-1).2\pi/3)$ thus is equal to VCC in the known power supply devices.

In order to preserve the sinusoidal form of the control signals Ii, it is suitable, in accordance with a preferred embodiment of the invention, to arrange the table TAB in such a manner that the duty cycle Ki of a driving signal C0i associated with a coil Ei, which is not connected to a reference-potential terminal, is equal to a difference between the duty cycle Ki0 which said driving signal C0i should have had if each one of the three coils had been subjected to a driving signal, and the duty cycle of the driving signal which would have been associated with the coil connected to the reference-potential terminal.

For example, during a time interval wherein the first coil E1 is connected to the ground GND, in this embodiment in accordance with the invention, K2=K20−K10 and K3=K30−K10. These conditions can be expressed as follows: $K2=K.(\sin(wt-2\pi/3)-\sin(wt))$ and $K3=K.(\sin(wt-4\pi/3)-\sin(wt))$, or, when use is made of trigonometric formulas: $\sin(a)-\sin(b)=2.\sin((a-b)/2).\sin((a+b)/2)$ and $\cos(a)=\sin(\pi/2-a)$, $K2=3^{1/2}.K.\sin(wt-5\pi/6)$ and $K2=3^{1/2}.K.\sin(wt-7\pi/6)$.

Thus, it turns out that as a result of the fact that the duty cycles are balanced in order to preserve a sinusoidal shape of the control signals Ii despite the fact that each coil is connected to a reference-potential terminal during one third of the period of these control signals, the maximum value of the duty cycles Ki is equal to $3^{1/2}/2$, since K is smaller than or equal to ½. A supply voltage of $3^{1/2}.VCC/2$ or approximately 0.87. VCC is thus sufficient, in this preferred embodiment in accordance with the invention, to obtain control signals Ii which can be written as $Ii=I0. \sin(wt-(i-1).2\pi/3)$.

This enables a reduction of approximately 15% of the power consumed by the motor as compared to the power necessary to perform the same task when the motor is energized by means of known power supply devices, or, at the same power consumption, a 15% increase in motor power. The invention thus enables, in this preferred embodiment, a 15% increase of the efficiency of the power supply device of the motor in addition to the improvement resulting from the reduction by one third of the losses caused by the number of switching operations in the power stages.

Figure 5A:
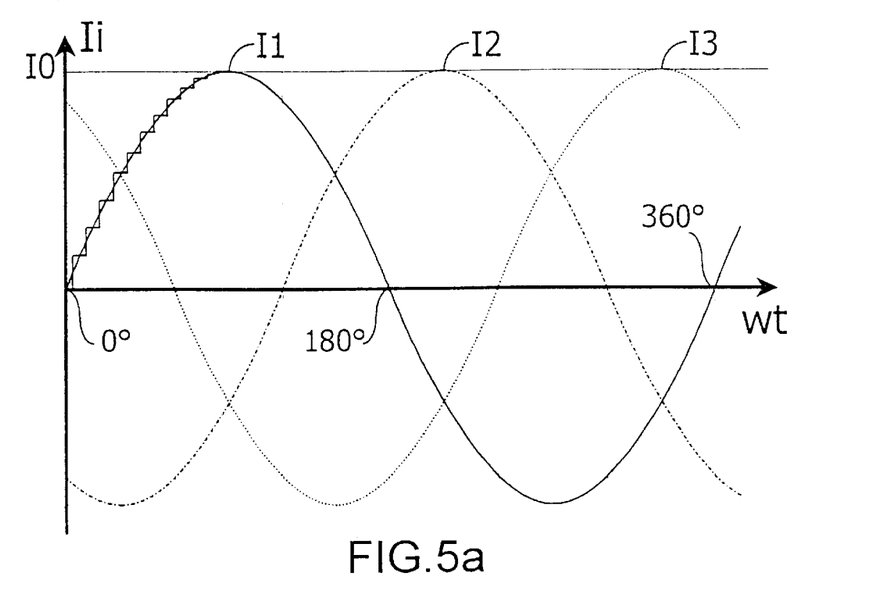
FIGS. 5a, 6a, 7a and 8a are curves showing the theoretical course of control signals present in the coils of the motor.
Figure 5B:
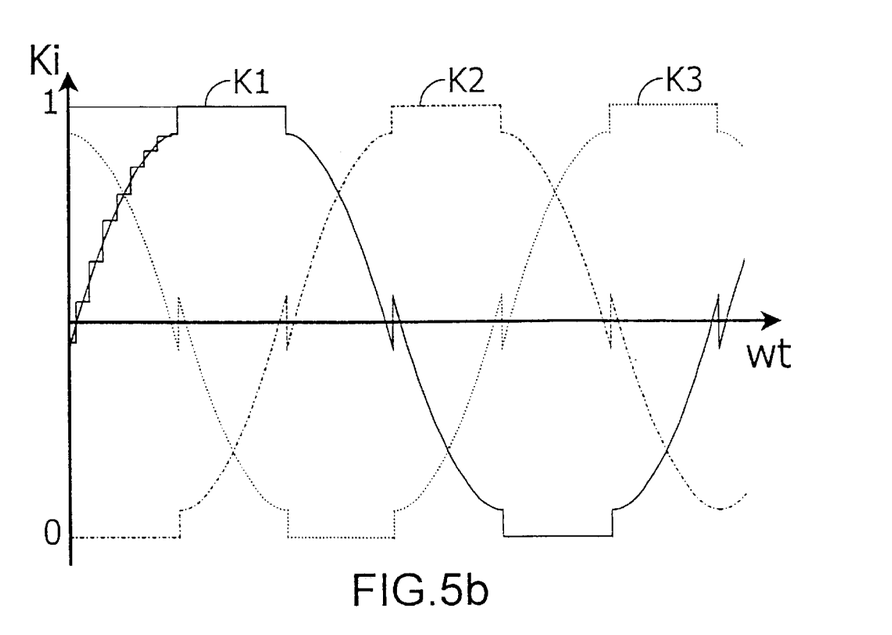
FIGS. 5b, 6b, 7b and 8b are curves showing the theoretical course of control signals generated in accordance with various embodiments according to the invention, and FIG. 9 diagrammatically shows an information-storage system wherein the invention is embodied.

FIGS. 5a and 5b show, respectively, the shape of the control signals Ii and the shape of the duty cycles Ki of the associated driving signals C0i, in an embodiment of the invention where a coil Ei is connected alternately to the positive supply terminal VCC or to the ground GND when the absolute value of the associated control signal Ii is larger than the absolute value of the other control signals. The sinusoidal curves represent the course followed by the discrete values which, in general, actually form these signals, which discrete values are shown only in the first parts of the curves I1 and K1 following the instant t=0 in order to improve the readability of the drawing. The step chosen in this case for the incrementation of the pointers of the table TAB is, in this example, a step of $\pi/9$ or 10°, but other step values may of course be chosen according to the particular requirements connected with the intended applications of the embodiment in accordance with the invention.

The course followed by the control signals Ii can be expressed by the formula $Ii=IO.\sin(wt-(i-1).2\pi/3)$.

Throughout the interval [60°; 120°], the first control signal I1 is positive and its absolute value is larger than the absolute value of the other control signals I2 and I3. The first coil E1 is then connected to the positive supply terminal VCC, which means that the duty cycle K1 of its associated driving signal C01 is maintained at 1, but during this interval, the coil E1 is no longer subjected to this driving signal. Throughout the interval [210°; 330°], the first control signal I1 is negative and its absolute value is larger than the absolute value of the other control signals I2 and I3. The first coil E1 is then connected to the ground GND, which means that the duty cycle K1 of the associated driving signal C01 is maintained at 0, but during this interval, the coil E1 is no longer subjected to this driving signal.

It has been shown hereinabove that when the first coil E1 is connected to the ground GND, the values of the duty cycles of the driving signals C02 and C03 associated with the other coils E2 and E3 advantageously follow courses defined by the equations $K2=3^{1/2}.K.\sin(wt-5\pi/6)$ and $K3=3^{1/2}.K.\sin(wt-7\pi/6)$. This explains why the curves that are representative of the courses of said duty cycles K2 and K3, respectively, lag and lead by 30° with respect to their associated control signals I2 and I3.

This phenomenon is explained in the foregoing by means of an example wherein the first coil E1 is connected to ground, however, it will be clear that the courses of the duty cycles of each pair of driving signals of coils which, during a given interval, are not connected to a reference terminal are similarly affected by this phenomenon as a result of their periodicity.

The Figure clearly shows that the maximum value of the duty cycles Ki, which are necessary to obtain control signals Ii which meet the equation $Ii=IO.\sin(wt-(i-1).2\pi/3)$, is only 0.87 instead of 1, which latter value is necessary in the known power supply devices, which illustrates a 15% improvement in efficiency, in addition to the reduction of losses caused by switching operations, in this embodiment in accordance with the invention.

Figure 6A:
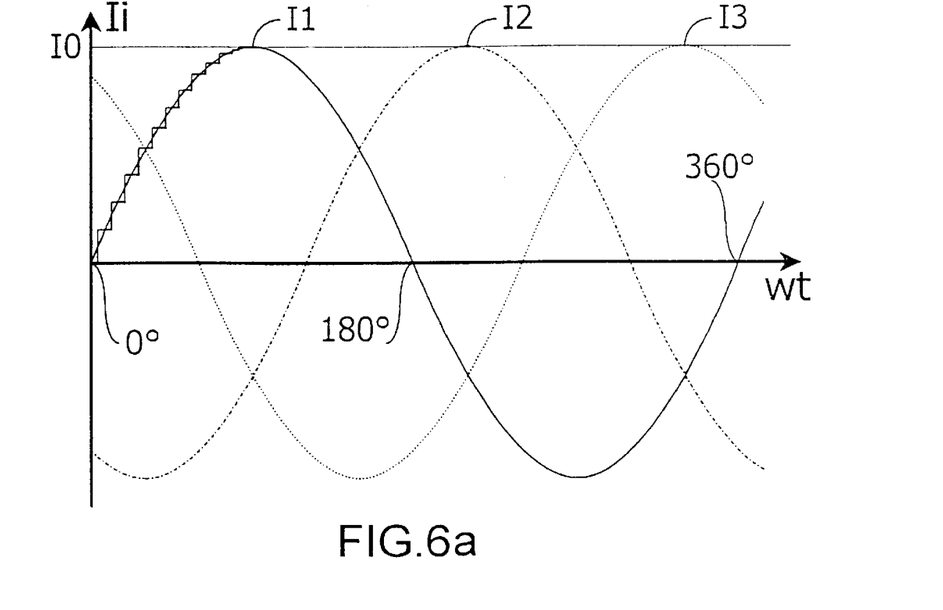
Figure 6B:
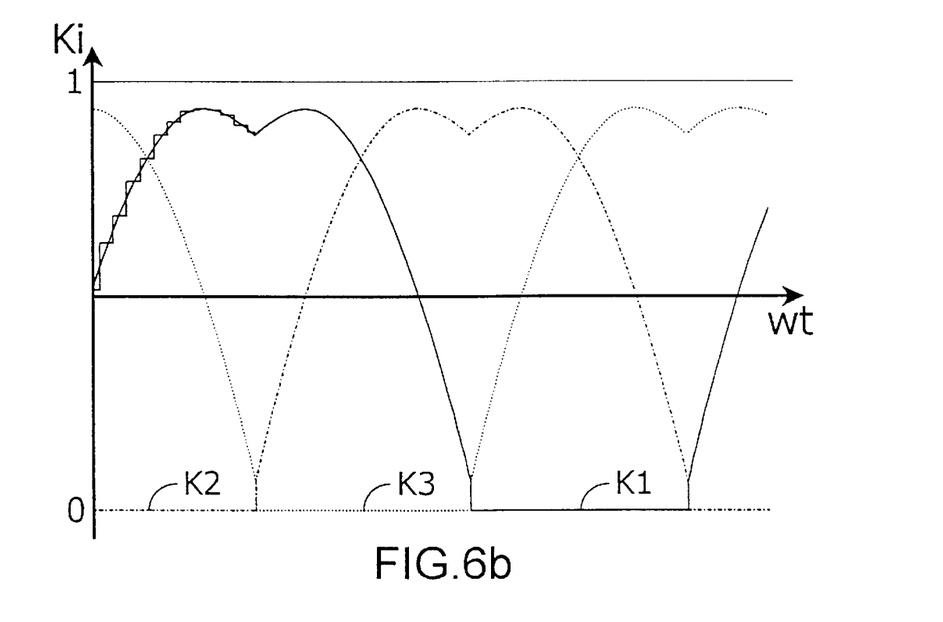

FIGS. 6a and 6b show, respectively, the shape of the control signals Ii and the shape of the duty cycles Ki of the associated driving signals C0i, in an embodiment of the invention where a coil Ei is connected to ground GND when the instantaneous value of the associated control signal Ii is smaller than the instantaneous value of the other control signals. FIG. 6a is identical to FIG. 5a, showing control signals Ii which follow a course expressed by the formula $Ii=IO.\sin(wt-(i-1).2\pi/3)$.

Throughout the interval [210°; 330°], the instantaneous value of the first control signal I1 is lower than the instantaneous value of the other control signals I2 and I3. The first coil E1 is then connected to the ground GND, which means that the duty cycle K1 of the associated driving signal C01 is maintained at 0, but during this interval, the coil E1 is no longer subjected to this driving signal. It has been described hereinabove that when the first coil E1 is connected to the ground GND, the values of the duty cycles of the driving signals C02 and C03 associated with the other coils E2 and E3 advantageously follow courses which are defined by the equations $K2=3^{1/2}.K.\sin(wt-5\pi/6)$ and $K3=3^{1/2}.K.\sin(wt-7\pi/6)$. This explains why the curves that are representative of the courses of these duty cycles K2 and K3, respectively, lag and lead by 30° with respect to the associated control signals I2 and I3.

The Figure clearly shows that the maximum value of the duty cycles Ki, which are necessary to obtain control signals Ii which meet the equation $Ii=IO.\sin(wt-(i-1).2\pi/3)$, is only 0.87 instead of 1, which latter value is the necessary value in the known power supply devices, which illustrates a 15% efficiency increase, in addition to the reduction of the losses caused by the switching operations, in this embodiment in accordance with the invention.

Figure 7A:
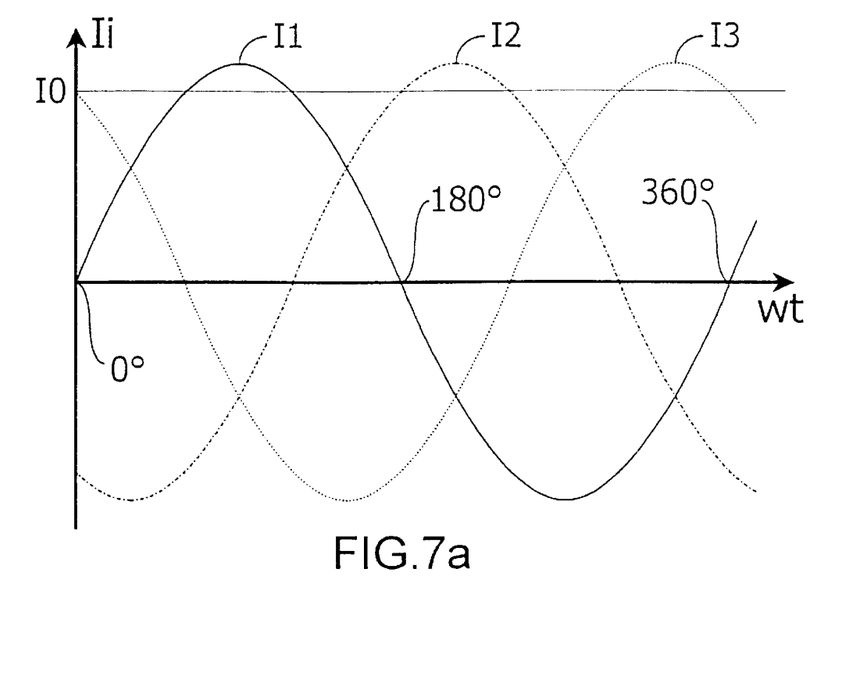
Figure 7B:
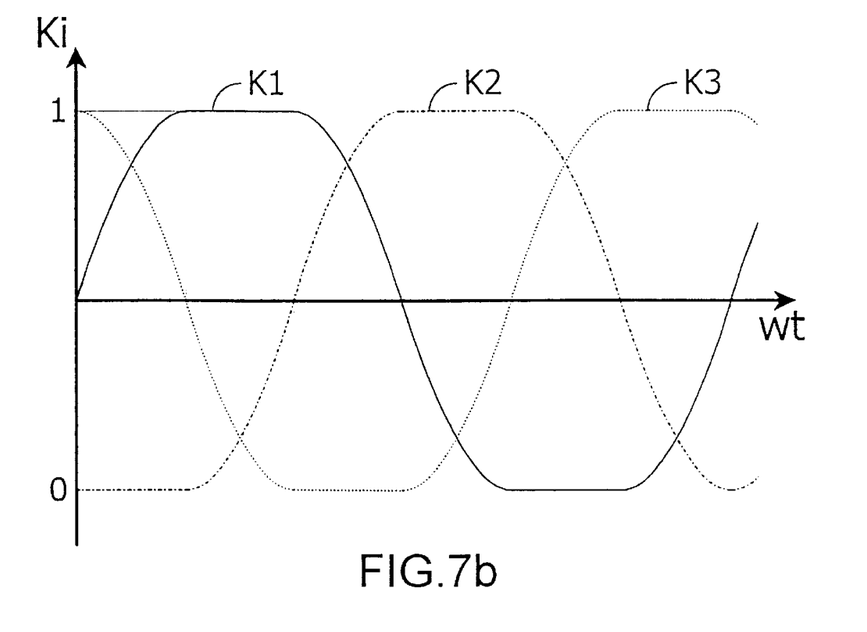

FIGS. 7a and 7b illustrate this advantage of the invention from a different perspective. These Figures show, respectively, the shape of the control signals Ii and the shape of the duty cycles Ki of the associated driving signals C0i, in an embodiment of the invention where a coil Ei is connected alternately to the positive power supply terminal VCC and to the ground GND when the absolute value of the associated control signal Ii is higher than the absolute value of the other control signals. The control signals Ii follow a course which is expressed by the formula $Ii=(\frac{2}{3}^{1/2}).IO.\sin(wt-(i-1).2\pi/3)$, i.e. the power provided by the motor is approximately 1.15 times that of the motor described in FIGS. 5a and 6a. In accordance with the explanations given hereinabove, the values of the duty cycles Ki of the driving signals C0i associated with the control signals Ii lie in the range between 0 and 1 in the case shown, i.e. in accordance with this advantageous embodiment of the invention, a supply voltage of the power stages that is equal to the supply voltage necessary for the known power supply devices enables an increase of the power supplied by the motor of 15% to be achieved.

Figure 8A:
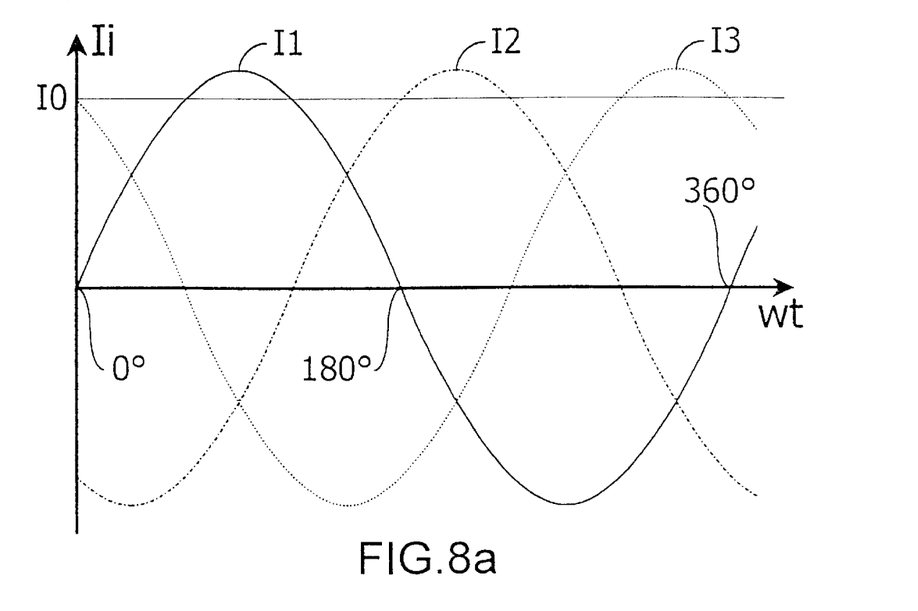
Figure 8B:
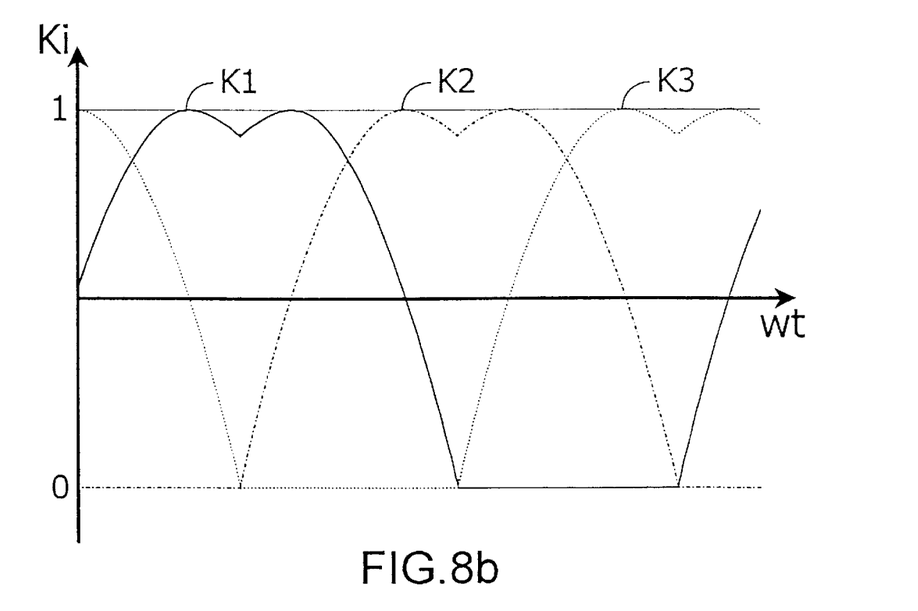

FIGS. 8a and 8b show, respectively, the shape of the control signals Ii and the shape of the duty cycles Ki of the associated driving signals C0i, in an embodiment of the invention where a coil Ei is connected to the ground GND when the instantaneous value of the associated control signal Ii is smaller than the instantaneous value of the other control signals. The control signals Ii follow a course expressed by the formula $Ii=(\frac{2}{3}^{1/2}).IO.\sin(wt-(i-1).2\pi/3)$, i.e. the power supplied by the motor is approximately 1.15 times the power supplied in the case described with reference to FIGS. 5a and 6a. Also in this case, the values of the duty cycles Ki of the driving signals C0i associated with the control signals Ii range between 0 and 1, i.e. a supply voltage from the power stages that is equal to the supply voltage necessary for the known power supply devices enables a 15% increase of the power supplied by the motor.

Figure 9:
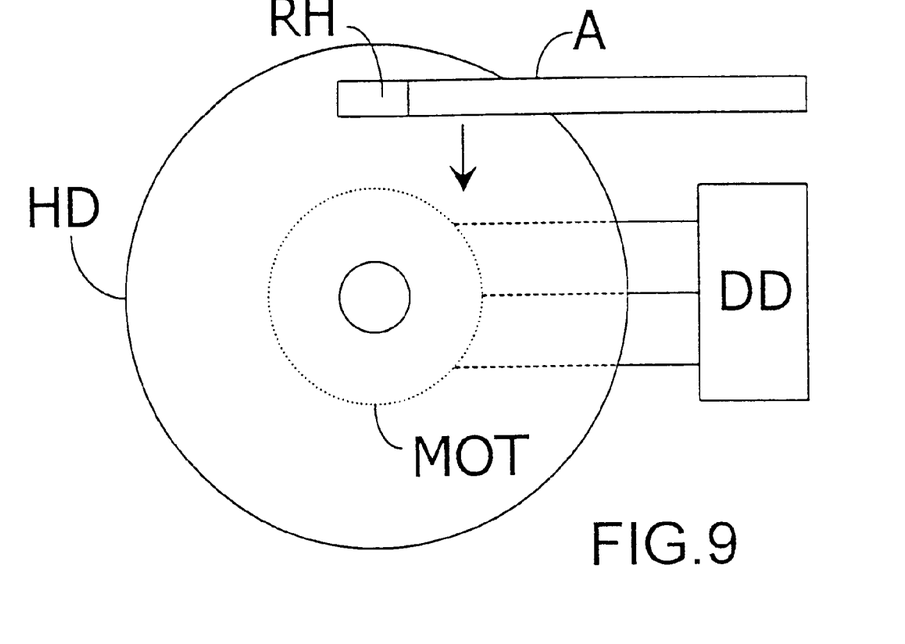

FIG. 9 very diagrammatically shows an apparatus for storing information, comprising:

a disc HD on the surface of which information is stored, a polyphase motor MOT which is used to drive the disc to rotation, at least one read/write head RH, which is arranged at the end of a tangential arm A, and which is used to scan the surface of the disc, and a power supply device DD of the motor MOT.

What is claimed is:

1. A method of energizing a polyphase motor by means of a plurality of coils, each coil intended to be excited by means of a control signal, comprising:

identifying the control signal having the largest absolute value by detecting a sign reversal of a control signal; and connecting a coil excited by said control signal having the largest absolute value to a reference-potential terminal.

2. A method as claimed in claim 1, wherein each control signal is composed of a succession of discrete values, which follow a pseudo-sine line as a function of time when the coil excited by said signal is not connected to a reference-potential terminal.

3. A method as claimed in claim 2, wherein each discrete value is obtained by setting a duty cycle of a signal referred to as driving signal, which serves to control the conduction of two transistors, which are arranged in series between two supply terminals, an intermediate node between said transistors being connected to one terminal of one of the coils.

4. A method as claimed in claim 3, wherein the duty cycle of a driving signal associated with a coil, which is not connected to a reference-potential terminal, is equal to a difference between the duty cycle which said driving signal should have had if each one of the three coils had been subjected to a driving signal, and the duty cycles of the driving signal which would then have been associated with the coil connected to the reference-potential terminal.

5. A method of energizing a polyphase motor by means of a plurality of coils, each coil intended to be excited by means of a control signal, comprising:

identifying the control signal having the largest instantaneous value by detecting a sign reversal of a control signal; and connecting a coil excited by said control signal having the largest instantaneous value to a reference-potential terminal.

6. A method of energizing a polyphase motor by means of a plurality of coils, each coil intended to be excited by means of a control signal, comprising:

identifying the control signal having the smallest instantaneous value by detecting a sign reversal of a control signal; and connecting a coil excited by said control signal having the smallest instantaneous value to a reference-potential terminal.

7. A device for supplying power to a polyphase motor comprising a plurality of coils, each coil intended to be excited by means of a control signal, which device comprises:

control means enabling each coil to be alternately connected to one reference-potential terminal, and identification means enabling identification of the coil which is to be connected to the reference-potential terminal and comprising means for detecting a sign reversal of a control signal from said control means.

8. A power supply device as claimed in claim 7, wherein the identification means are controlled so as to identify the coil that is subjected to the control signal having the largest absolute value.

9. A power supply device as claimed in claim 7, wherein the identification means are controlled so as to identify the coil that is subjected to the control signal having the largest instantaneous value.

10. A power supply device as claimed in claim 7, wherein the identification means are controlled so as to identify the coil that is subjected to the control signal having the smallest instantaneous value.

11. A power supply device as claimed in claim 7, wherein the identification means include:

means for detecting a sign reversal of the control signal, and delay means, which are activated by the detection means, and which are used to supply an identification signal to the control means after a predetermined delay following the detection of a sign reversal of a control signal.

12. An apparatus for storing information, comprising:

a disc on the surface of which information is stored, a polyphase motor intended to drive the disc to rotation, at least one read/write head, intended to scan the surface of the disc, and a power supply device of the motor as claimed in claim 7.

* * * * *

Disclaimer 6,479,955—Emeric Uguen, La Presnaye au Sauvage, (FR); Henricus Cornelis Johannes Büthker, Eindhoven (NL); Henricus Marinus Van Hout, Eindhoven, (NL). METHOD OF ENERGIZING A POLYPHASE MOTOR HAVING AN INCREASED ENERGY EFFICIENCY. Patent dated November 12, 2002. Disclaimer filed March 28, 2008, by the assignee, Koninklijke Philips Electronics N.V.

Hereby enters this disclaimer to all claims of said patent.

*(Official Gazette October 7, 2008)*